United States Patent [19]

Hara et al.

[11] Patent Number: 4,583,171

[45] Date of Patent: Apr. 15, 1986

[54] TRANSMISSION CONTROL DEVICE FOR VEHICLE

[75] Inventors: Kiyoshi Hara, Oubu; Yutaka Ninoyu, Anjo; Munetaka Noda, Nagoya, all of Japan

[73] Assignee: Nippondenso Co., Ltd., Kariya, Japan

[21] Appl. No.: 499,695

[22] Filed: May 31, 1983

[30] Foreign Application Priority Data

Jun. 1, 1982 [JP] Japan .................. 57-93696

[51] Int. Cl.⁴ .................. B60K 20/16; F16H 5/20
[52] U.S. Cl. .................. 364/424.1; 74/365; 74/861
[58] Field of Search .......... 364/421.1; 74/365, 861, 74/866

[56] References Cited

U.S. PATENT DOCUMENTS

| 3,937,105 | 2/1976 | Arai et al. | 74/866 X |
| 3,943,799 | 3/1976 | Sakai et al. | 74/866 |
| 3,961,546 | 6/1976 | Gilmore et al. | 74/866 |
| 4,026,169 | 5/1977 | Kühnle et al. | 74/861 |
| 4,030,380 | 6/1977 | Mutter | 74/866 |
| 4,150,416 | 4/1979 | Heppenstall et al. | 74/365 |
| 4,253,346 | 3/1981 | Kühnle et al. | 74/861 |
| 4,324,153 | 4/1982 | Sugimoto et al. | 74/866 |
| 4,361,060 | 11/1982 | Smyth | 74/866 |
| 4,442,730 | 4/1984 | Snoy | 74/475 |

FOREIGN PATENT DOCUMENTS

| 0007881 | of 0000 | European Pat. Off. | 364/442 |
| 1525032 | of 0000 | United Kingdom | 340/52 R |
| 2084524 | of 0000 | United Kingdom | 364/442 |

Primary Examiner—Felix D. Gruber
Attorney, Agent, or Firm—Cushman, Darby & Cushman

[57] ABSTRACT

In an automatic transmission control device, an electric selector includes a circular common switch, a P range switch, a R range switch, a N range switch and a D range switch. A range shifting is instructed by the electric selector. When the common switch and one of the range switches are both operated in a predetermined manner, an instruction signal is delivered from the electric selector to a microcomputer. The microcomputer discriminates whether the instruction is proper or not. When the instruction is not proper, the microcomputer does not generate range shifting signals to a transmission actuator and generates a long buzzer drive signal. A driver of a vehicle is notified about this fact by a long sound of a buzzer.

5 Claims, 5 Drawing Figures ically between them. For instance, the 2nd range and L range may be further provided.

TRANSMISSION CONTROL DEVICE FOR VEHICLE

BACKGROUND OF THE INVENTION

This invention relates to a transmission control device for vehicles.

A typical construction of conventional automatic transmission control devices includes a torque converter, a transmission mechanism, an oil pressure pump, a mechanical selector, a manually operated valve which controls oil circuits for realizing a desired transmission range, and a shift valve which upon reception of an electric signal, operates the transmission mechanism in a desired transmission range. The transmission ranges are ordinarily made of D range (driving range), 2nd range, L range, N range (neutral range), R range (reverse range) and P range (parking range), and any one of these ranges is selected by a mechanical selector. For realizing the selection, the selector is interlinked with the manually operated valve through a mechanical linkage. Accordingly, the conventional device inevitably increases the size of the selector, and necessitates the mechanical linkage, thus restricting the freedom of vehicle design and interfering with the aesthetics of the interior of the vehicle.

SUMMARY OF THE INVENTION

Accordingly, an object of the present invention is to eliminate the above described difficulties by the use of an electric selector.

Another object of the invention is to eliminate a problem of erroneous operation tending to be caused at the time of the range selection, which is predictable from the use of the electric selector.

According to the present invention, a plurality of range switches operated by a vehicle driver generate respective instruction signals corresponding to selected range positions of an automatic transmission. A common switch is also provided close to the range switches for generating a common signal when operated by the vehicle driver. Circuitry is provided for determining when the common signal from the common switch and a selected one of the instruction signals from the range switches corresponding to a selected range position are generated in a predetermined manner. When the common signal and the selected instruction signal are generated in the predetermined manner, the selected instruction signal is outputted which is employed to cause the automatic transmission to be shifted into the corresponding range.

DETAILED DESCRIPTION OF THE PREFERRED EMBODIMENT

Figure 1:
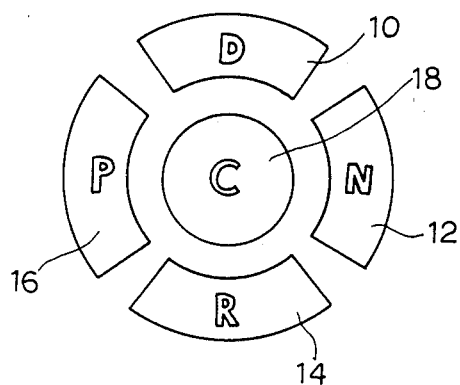
FIG. 1 is a diagram showing the arrangement of an electric selector used in the embodiment of the invention.

FIG. 1 illustrates an arrangement of an electric selector. The electric selector may be provided at a position near the driver's seat and slightly behind on one side of the steering wheel extending from the steering column. In FIG. 1, numerals 10, 12, 14 and 16 designate D (driving) range, N (neutral) range, R (reverse) range and P (parking) range selecting push-button type self-reset switches, respectively. Numeral 18 designates a common switch of the self-reset type.

An internal lap is provided in each of the switches 10 through 18.

When it is desired to shift ranges in the transmission control device, it is required to operate a desired one of the switches 10 through 16 together with the common switch 18. For facilitating such an operation, the range switches 10 through 16 are provided to surround the circular common switch 18. At the time of the range shifting operation, the two switches are depressed simultaneously by two fingers. However, the switches may be arranged in a different manner from the above arrangement. For instance, the 2nd range and L range may be further provided.

Figure 2:
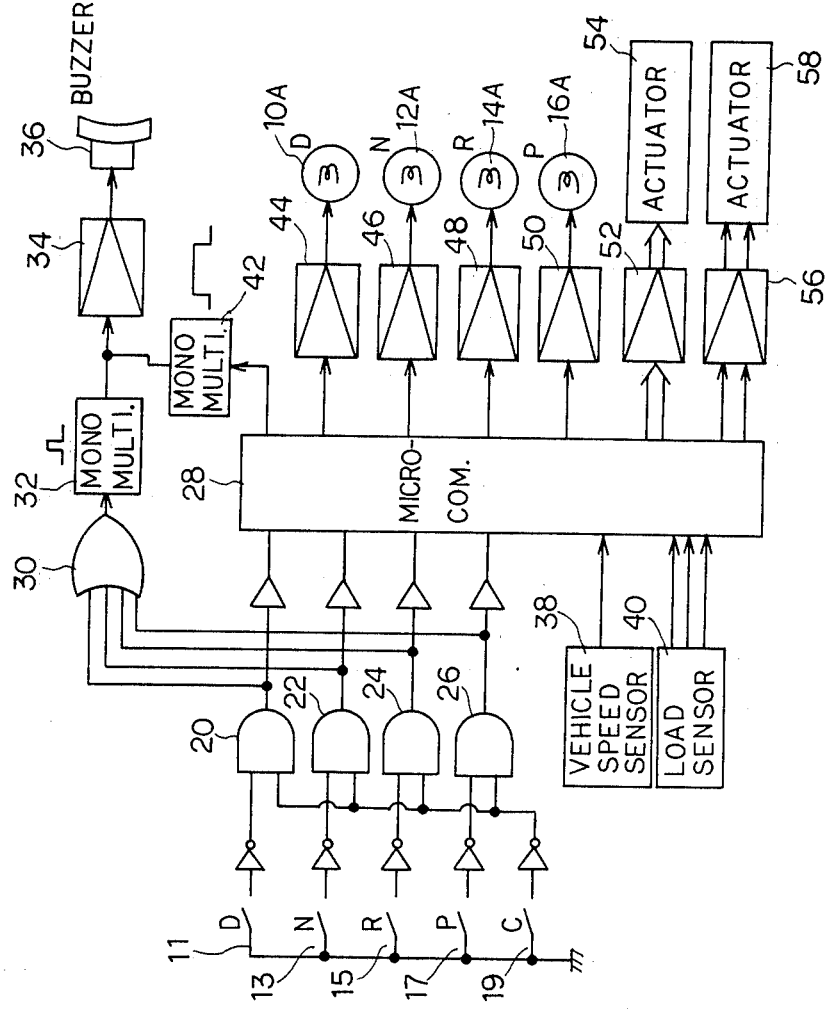
FIG. 2 is a diagram showing the general composition of the control device.

FIG. 2 shows a general construction of the control device according to the present invention. In FIG. 2, a switch 11 corresponds to the D range switch 10 in FIG. 1, and likewise, a switch 13 corresponds to the N range switch, a switch 15 corresponds to the R range switch 14, a switch 17 to the P range switch 16, and a switch 19 corresponds to the common switch 18. On-off signals delivered from these switches are converted by inverters into signals which are in a high level when the switches are operated (closed), and in a low level when the switches are not operated (opened). The inverted signals delivered from the inverters are then applied to logic gates 20, 22, 24 and 26.

The logic gates 20 through 26 are composed of AND gates which deliver outputs of high level when the range signals from the range switches 11, 13, 15 and 17 and the common signal from the common switch 19 satisfy a logic product condition. More specifically, when the D range switch 11 and the common switch 19 are operated simultaneously, a high-level signal appears at the output of the logic gate 20, and when the P range switch 17 and the common switch 19 are operated simultaneously, a high-level signal appears at the output of the logic gate 26. The instruction signals subjected to a logic condition discriminating operation are then delivered through buffer amplifiers to a computer 28. In this embodiment, a one-chip microcomputer with a control program and a transmission control pattern data is utilized for the computer 28. The control program in this case is adapted to set an instruction processing sequence required for executing control function of the transmission. The computer 28 is further programmed such that the range shifting signals corresponding to the instruction signals from the logic gates 20, 22, 24 and 26 are delivered to the computer 28 and are accepted by computer 28 a time other than the time required for supervising the control of the transmission. The contents of the control programs of the computer will be described hereinlater in more detail.

The instruction signals appearing at the output terminals of the logic gates 20, 22, 24 and 26 are also delivered to a logic gate 30. The logic gate 30 is a 4-INPUT OR gate which produces a high-level output signal when any one of the input terminals receives an operating signal of a high level. The output high-level signal of the logic gate 30 is applied to a first monostable multivibrator 32 as a trigger signal. The monostable multivibrator 32 delivers a timer signal, which is maintained at a high level for several hundred milliseconds, in synchronism with the rising-up of the high level output signal. The timer signal is delivered into a driving circuit 34 for operating a buzzer 36 of a piezo-electric type for a short time. The buzzer 36 is located at an appropriate position near the seat of the driver, and reports that the switching operation of the range switches 11 to 19 has been carried out normally at the time of the generation of the operation signals.

Numerals 38 and 40 designate a vehicle speed sensor and a load sensor of known types, which are used for discriminating control conditions of the transmission system of the vehicle. The sensor 38 generates one pulse for every unit rotation angle of wheels, while the load sensor 40 generates a code signal corresponding to the opening degree of the throttle valve of the vehicle engine.

Driving circuits 44, 46, 48, 50, 52 and 56 and a second monostable multivibrator 42 are connected to the output side of the computer 28. The driving circuits 44, 46, 48 and 50 are connected with the internal lamps 10A, 12A, 14A and 16A of the range switches 10, 12, 14 and 16 for energizing the lamps selectively. Thus, the energizing of the lamp indicates the reception of the instruction signal by the computer 28.

The driving circuit 52 is connected with an actuator 54 of the manual valve (not shown) of the transmission system. Upon reception of an output from the computer 28, the driving circuit 52 drives the actuator 54 so that it realizes a desired one of the D, N, R and P ranges. The actuator 54 may be constructed in the form of a hydraulic servomechanism combined with an electromagnetic valve, or in the form of an electrically driven servomechanism combined with an electric motor.

The driving circuit 56 is connected with another acutator 58, and upon reception of an output from the computer 28, the driving circuit 56 drives the actuator 58 so as to realize the desired transmission gear ratio of the transmission system.

The second monostable multivibrator 42 receives a trigger signal from the computer 28, and delivers a timer signal which is brought into high level in synchronism with the rising-up of the trigger signal, and maintained at the high level for a time interval of 1 to 2 seconds. The timer signal is applied to the driving circuit 34 together with the output signal from the first monostable multivibrator 32 so as to energize the buzzer 36 for a comparatively long period. The computer 28 is so programmed that it triggers the second monostable multivibrator 42 when the computer receives the instruction signal and judges that the range shifting operation designated by the instruction signal is not proper. The buzzer 36 is thus operated for a comparatively long period, and the driver of the vehicle is notified that the shifting of the transmission range is not appropriate.

The transmission control device operates in accordance with control programs beforehand set in the computer 28. The operation of the computer 28 will now be described with reference to the flow-charts shown in FIGS. 3, 4 and 5.

Figure 3:
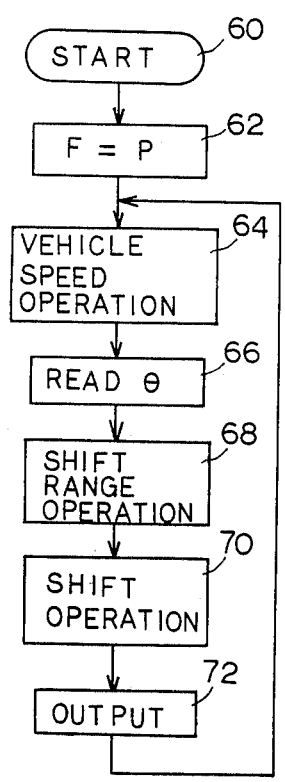
FIG. 3 is a flow-chart showing a main routine of a microcomputer.

FIG. 3 illustrates the main routine in which a control program is repeated executed. Numeral 60 designates a starting step wherein an ignition key switch (not shown) is turned ON thereby to start operation of the computer 28. In an initial setting step 62, the computer 28 sets data P indicating P range as a flag F (data in a specific address of a memory device of the computer 28) indicative of a range selected at that time.

In the next step 64, the computer 28 calculates a vehicle speed from a time interval between the pulse signals delivered from the speed sensor 38, and converts the calculation results into a binary coded signal, and stores the signal into a predetermined address of the memory device. In the step 66, the computer reads a coded signal $\theta$ representing the opening of the throttle valve, delivered from the load sensor 40, and stores the signal in a predetermined address of the memory device.

In the shift range step 68, the computer calculates data indicative of an appropriate range position which is used to set the range flag, based on the status of the instruction signals (switch data stored in the memory device during the hereinafter described timer interruption routine) delivered from the logic gates 20–26.

In the shift operation step 70, the computer 28 determines an optimum shift position based on the operation range at that time of the transmission system, and the data indicative of the running speed and the load condition of the vehicle, which are obtained in the steps 64 and 66, and stores the data corresponding to the optimum shift position in the memory device. The computer 28 is so programmed that, at the time of determining the shift position, the computer refers to the transmission control pattern data memorized in memory device (ROM). Since the transmission control system utilizing the transmission control pattern data are widely known, detailed description thereof will be omitted.

In the step 72, the computer delivers the output signals corresponding to the data related to the range flag and the shift position data, which have been determined in the steps 68 and 70, the the driving circuits 52 and 56. The computer further delivers the output signal corresponding to the range flag to corresponding one of the driving circuits 44–50.

Figure 4:
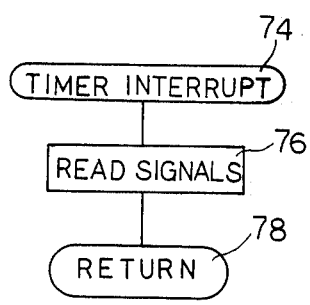
FIG. 4 is a flow-chart showing an interruption routine of the computer.

FIG. 4 illustrates a timer interruption routine to be executed at a time interval determined by an internal timer of the computer 28. In the shown example, it is so programmed that, at a step 74, the interrupting operation is initiated at a time interval of 10 milliseconds after the execution of the initial step 62. More specifically, the execution of the main routine is interrupted at the time interval of 10 milliseconds, and a reading step 76 of the interruption routine is executed. After the step 76, the operation is returned by a step 78 to the main routine. In the step 76, the output signals from the logic gates 20–26 are all read in the computer 28, and stored in the memory device.

Figure 5:
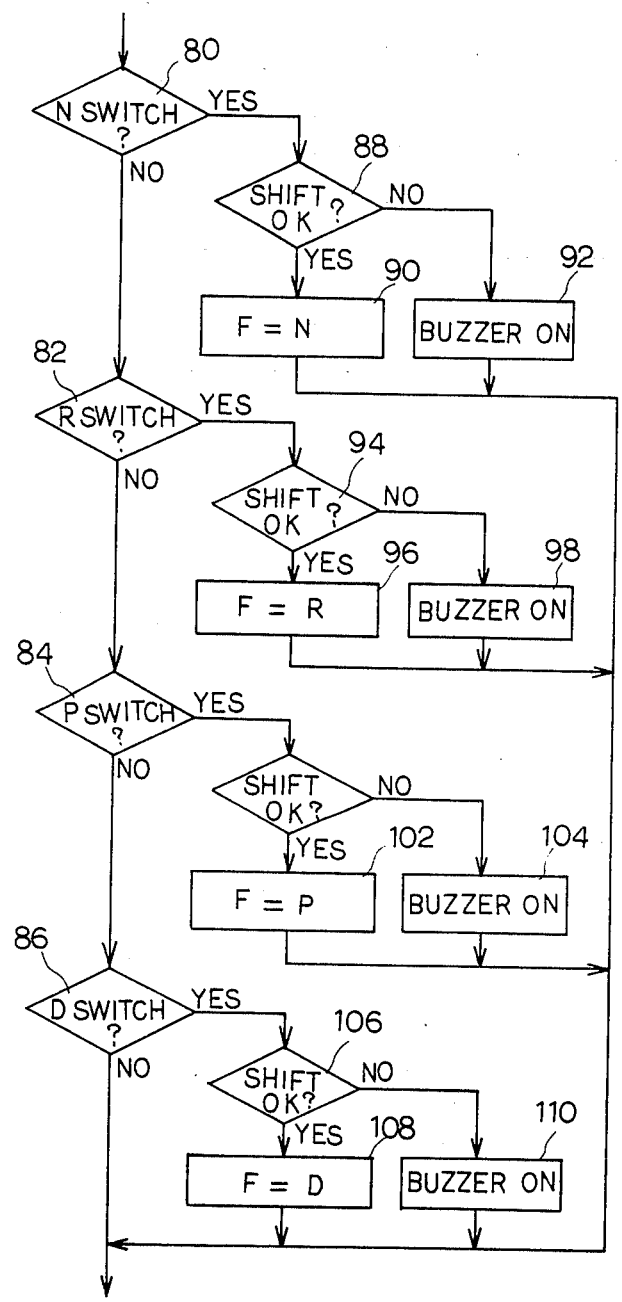
FIG. 5 is a flow-chart showing an important part of FIG. 3 in detail.

FIG. 5 illustrates the range operation step 68 an the main routine in detail. The step 68 includes substeps 80, 82, 84 and 86 which discriminate a designated range shifting operation with reference being made to the latest switch input data (operation signals) stored in the memory device. The discrimination is carried out successively on the ranges N, R, P and D, and when it is discriminated that a certain range shifting operation has been designated by the switch input data, the remaining discrimination steps with respect to the kinds of the ranges are abandoned. For this reason, even in a case where a plurality of range switches are operated simultaneously, a range shifting of the highest priority is executed and remaining ranges are abandoned. The priority may be beforehand set as desired. Furthermore, it may be so programmed that none of the ranges are executed simultaneously. In order to improve the accuracy of the discriminating operation, it would be preferably that the switch input data are accepted only when the data coincide with each other for a plurality of consecutive times of discrimination.

When a range shifting operation is discriminated in one of the steps 80–86, this operation is further discriminated in a step 88, 94, 100 or 106 as to whether the operation is proper or not. The discriminating condition may be determined according to the requirement. For instance, in the step 94 for discriminating the Rrange operation where the range is transferred from P range to R range, the discriminating condition is so determined that the range shifting operation is appropriate when the running speed of the vehicle is approximately zero, and inappropriate when the running speed is not approximately zero.

In a case where the range shifting operation is discriminated to be appropriate, the computer 28 sets, in a step 90, 96, 100 or 106, the range flag F to the data corresponding to the discriminated results. On the other hand, where the range shifting operation is discriminated to be inappropriate, the computer 28 delivers an output signal, in a step 92, 98, 104 or 110, to cause delivery of a trigger signal to the multivibrator 42.

In response to the execution of the programs as described above, the computer 28 drives the actuator 54 such that the actuator 54 selects the operation range corresponding to the operation of the range switches 10(11)–16(17). In this case, it is necessary that the range switch is operated simultaneously with the common switch 18(19), and any erroneous operation of the range switch can be thereby prevented even in a case of accidental touch of the switch. Furthermore, when it is required, a judgement whether the range shifting operation is appropriate or not is carried out in consideration of the running condition of the vehicle, and therefore the execution of any erroneous range shifting operation can be avoided. When the range shifting operation is judged to be not appropriate, the driver of the vehicle is notified about this fact by the sound of the buzzer 36 continues for a comparatively long period.

In case where the range switch is operated normally together with the common switch, the buzzer 36 is operated for a short period, and when the computer duly responds to the instruction signal of the range switch, the internal lamp of the range switch turns on, and whether the range switch has been appropriately operated or not and also the fact that the computer has duly responded to the switch operation are thereby reported to the driver of the vehicle. The computer then determines an optimum transmission ratio of the transmission based on the range thus selected and the driving condition of the vehicle, and controls the transmission.

Although the invention has been described with respect to a preferred embodiment thereof, it is apparent that the invention is not necessarily restricted to this embodiment and various modifications may be carried out within the scope of the present invention.

For instance, the above described simultaneous operations of the range switch and the common switch may be carried out in such a manner that these operations are accomplished with not completely same timing, but with a slight time delay. That is, the common switch may be firstly operated, and the range switch may be thereafter operated with a slight time delay.

Furthermore, the discrimination of operations of the range switches may be executed without utilizing logic gates, but may be carried out entirely by use of a microcomputer.

What is claimed is:

1. A transmission control device for a vehicle with an automatic transmission comprising;
    a plurality of range switches operated by a vehicle driver for generating respective instruction signals corresponding to selected range positions of said automatic transmission;
    a common switch provided close to said range switches for generating a common signal when operated by the vehicle driver;
    applying means for discriminating whether said common signal from said common switch and a selected one of said instruction signals from said range switches corresponding to said selected range position are generated in a predetermined manner and for outputting said selected instruction signal when said common signal and said selected instruction signal are generated in said predetermined manner;
    delivering means for delivering a corresponding range signal in response to said outputted instruction signal from said applying means; and
    actuator means for shifting the range of said automatic transmission in response to said corresponding range signal from said delivering means.

2. A transmission control device according to claim 1, wherein said applying means outputs said selected instruction signal to said delivering means only when said common signal and said selected instruction signal are generated simultaneously.

3. A transmission control device according to claim 1, wherein:
    said device further comprises an alarm; and
    said delivering means also discriminates, in response to said outputted instruction signal, whether predetermined conditions for range shifts are satisfied to generate said corresponding range signal only when said predetermined conditions are satisfied, said delivering means also generating an alarm signal to activate said alarm for an interval of time when said predetermined conditions are not satisified.

4. A transmission control device according to claim 3 further comprising alarm signal generating means for generating another alarm signal in response to said outputted instruction signal thereby to activate said alarm for another interval of time shorter than said interval of time.

5. A transmission control device according to claim 1 further comprising indication means, activated by said delivering means, for indicating actual range position of said automatic transmission controlled by said delivering means.

* * * * *